April 24, 1934.  T. BROWN ET AL  1,955,789
AGRICULTURAL IMPLEMENT
Original Filed Oct. 24, 1929  4 Sheets-Sheet 3

April 24, 1934.　　　T. BROWN ET AL　　　1,955,789
AGRICULTURAL IMPLEMENT
Original Filed Oct. 24, 1929　　4 Sheets-Sheet 4

WITNESS
Walter Ackerman

INVENTORS
Theophilus Brown
Theodore W. Johnson
BY Brown, Jackson, Boettcher & Dienner
ATTORNEYS Patented Apr. 24, 1934

1,955,789

UNITED STATES PATENT OFFICE 1,955,789

AGRICULTURAL IMPLEMENT

Theophilus Brown and Theodore W. Johnson, Moline Ill., assignors to Deere & Company, Moline, Ill., a corporation of Illinois Application October 24, 1929, Serial No. 402,065
Renewed March 18, 1933

32 Claims. (Cl. 97—50)

The present invention relates generally to agricultural implements, and more particularly to motor cultivators wherein the cultivating rigs are mounted on or are propelled directly by a tractor.

One of the principal objects of the invention is to provide an improved construction of motor cultivator having cultivating rigs disposed at the front and rear ends of the tractor. It is now quite customary in these motor cultivators to mount the cultivator rigs at the front end of the tractor, but we have found that frequently the use of such rigs alone is not adequate to perform a thorough cultivating operation. For example, the rear driving wheels of the tractor, following after the front cultivating rigs, pack the soil down and tend to defeat the cultivating operation in the line of travel of the wheels. Moreover, in three row cultivating operations where the middle plant row passes under the center of the tractor it is frequently difficult to cultivate effectively up close to the sides of the middle plant row when only using cultivating rigs at the front end of the tractor. Such is also true in four row cultivating operations. The improved construction of the present invention avoids these difficulties by providing cultivating rigs disposed adjacent to the rear end of the tractor and in a position to cultivate the soil traveled over by the tractor wheels and to cultivate the soil up close to the intermediate plant row or rows.

In this type of implement, one of the particular objects of the invention is to provide improved mechanism for jointly controlling or actuating both the front and rear sets of rigs. More specifically, this improved mechanism is in the form of power lift apparatus, deriving its operating power from the engine of the tractor and serving to raise both sets of rigs to transport position and to lower both sets to cultivating position, the raising or lowering of all of the rigs occurring as a substantially simultaneous operation from a single control movement by the operator. In this regard, it is another object of our invention to provide improved power take-off mechanism comprising a crank on the side of the tractor which can be utilized for transmitting power lift movement to either or both ends of the tractor for simultaneously lifting front and rear rigs as above described, or for transmitting power lift or other oscillatory intermittent motion to implement parts disposed at either end of the tractor.

A further object of the invention is to provide an improved relation of parts for mounting the rigs on the rear portion of the tractor and for transmitting lifting and lowering movements to these rear rigs.

Other more specific objects of the invention are: to provide an improved construction of lost motion or yieldable means for causing the cultivating tools to enter the ground; to provide improved adjusting means for adjusting the operating relation between the throw of the power lift crank on the tractor and the desired range or limit of the lifting and lowering motion of the rigs; and to otherwise improve upon the general construction of implements of this type.

Referring to the accompanying drawings wherein we have illustrated a preferred embodiment of our invention.

In the form of tractor shown, the front end of the frame is supported on steering wheels 11 and the rear end on traction wheels 12. For a three row type of cultivator the steering wheels 11 are preferably disposed relatively far apart and have knuckle pin mounting on the front axle 13, but for a four row type of cultivator these wheels would preferably be disposed relatively close together and mounted directly on a swiveling axle swinging horizontally under the frame. The motor, indicated generally at 14, is shown as being of the horizontal type with its crank shaft extending transversely of the tractor, the fly wheel 15 being mounted on one end of this crank shaft, but it will be understood that the invention is not essentially limited to the use of a tractor having this type of motor.

Figure 1:
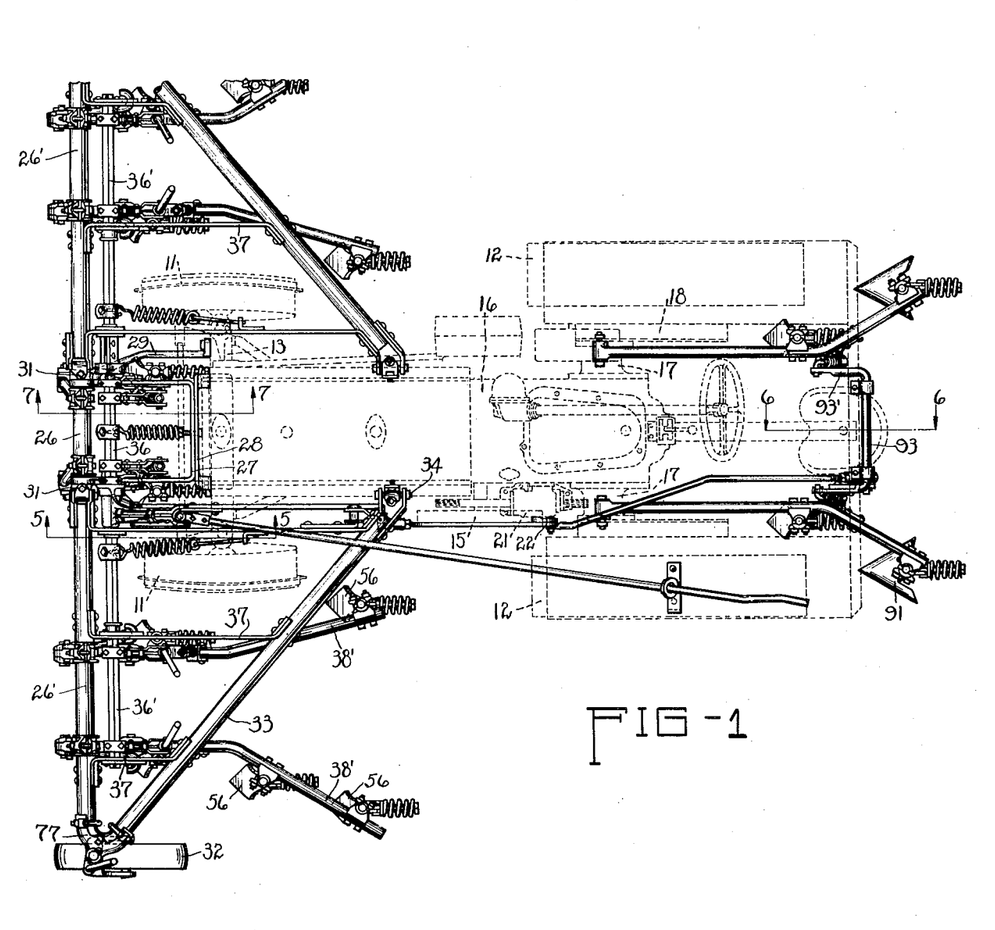
Fig. 1 is a plan view illustrating all of the implement attachment parts in full lines and illustrating the tractor in dotted lines.

The crank case of the motor comprises an integral part of a long housing 16 extending back to the driving mechanism for the rear wheels, this housing and the motor cylinders constituting the frame of the tractor. Enclosed within the housing 16 is the speed selecting gear mechanism and the differential mechanism through which power is transmitted to the rear wheels 12. Transverse jack shafts extend from this differential mechanism outwardly from the sides of the main housing 16 through extension housings 17 (Fig. 1) and have sprocket wheels mounted on their ends within chain housings 18. These chain housings extend downwardly from the extension housings 17 and support the stub axles on which the traction wheels 12 are mounted. Large sprocket wheels on these axles receive chains traveling over the aforesaid sprocket wheels on the outer ends of the jack shafts.
Within its broad aspect the invention is adaptable to any type of tractor, but there are certain specific details included therein which have particular application to the type of tractor above described.
Mounted on the side of the tractor is a power take-off unit indicated generally at 21. This unit comprises a crank 22 preferably arranged to swing in a vertical plane extending fore and aft of the tractor.
The housing 21' of the take-off device is mounted on the side of the main tractor housing 16, and engine power is transmitted from the transmission gearing or other driving parts within the housing 16 outwardly through suitable power take-off connections to the crank 22. A half-revolution clutch, such as is commonly employed in power lift operations, is preferably arranged within the housing 21' to control the transmission power to the crank 22, such type of clutch automatically interrupting the motion of the crank after each half-revolution and locking the crank in that position. The transmission of power from the engine driven mechanism within the housing 16 to the power lift crank 22 may be effected in various ways, one preferred form of driving train, including this half-revolution clutch, being shown in the copending application of Theophilus Brown and Linwood Murray on Tractors Ser. No. 399,980, filed Oct. 16, 1929.

The power take-off mechanism may also include a longitudinally extending shaft 23 having its ends projecting from the housing 21' and adapted to effect coupled engagement with extension shafts leading forwardly or rearwardly to implement parts which are to be driven with a substantially continuous rotary movement. The operation of the half-revolution clutch within the housing 21' may be readily controlled by the operator from his position on the driving seat 19 through the actuation of any suitable control devices for tripping the clutch.

The cultivator attachment for the front end of the tractor is similar in many respects to that disclosed in the copending application of Theophilus Brown Ser. No. 128,929 filed August 13, 1926, and hence we shall not describe all of the details of this front attachment.

The frame portion thereof comprises a transverse supporting bar built up of an intermediate section 26 (Fig. 1) and two lateral outrigger sections 26'. The intermediate section 26 is supported in a U-shaped bracket 27 which is pivotally connected to a bracket 28 mounted on the front end of the tractor, the U-shaped member 27 being free to rock or swivel about a longitudinally extending axis. Bracket arms 29 are secured to the end portions of the front wheel axle 13 and extend up to assist in supporting the ends of the intermediate bar section 26. Hinge joints 31 connect the outrigger sections 26' with the intermediate section 26 whereby the outrigger sections can rise and fall relatively to the intermediate section as the supporting wheels 32 at the ends of these outrigger sections pass over uneven ground. Diagonal reinforcing bars 33 extend inwardly and rearwardly from the outer ends of the outrigger sections and have pivotal mounting at 34 on the sides of the tractor so as to accommodate such rising and falling movement.

Disposed in rear of the front frame bar 26, 26' and extending substantially parallel therewith is a rock shaft consisting of an intermediate section 36 and two outwardly extending sections 36'. These rock shaft sections are supported in bearings carried by the intermediate frame section 27 and by braces 37 on the outrigger frame sections, and the inner ends of the outer shaft section 36' are coupled to the intermediate section 36 through universal joints which permit the outer sections to rise and fall with the outrigger frames.

The power lift movement for raising and lowering all of the front rigs, and the master depth adjustments for simultaneously adjusting the cultivating depth of all of these front rigs, are transmitted through this rock shaft, as we shall presently describe.

Figures 6, 7, 8:
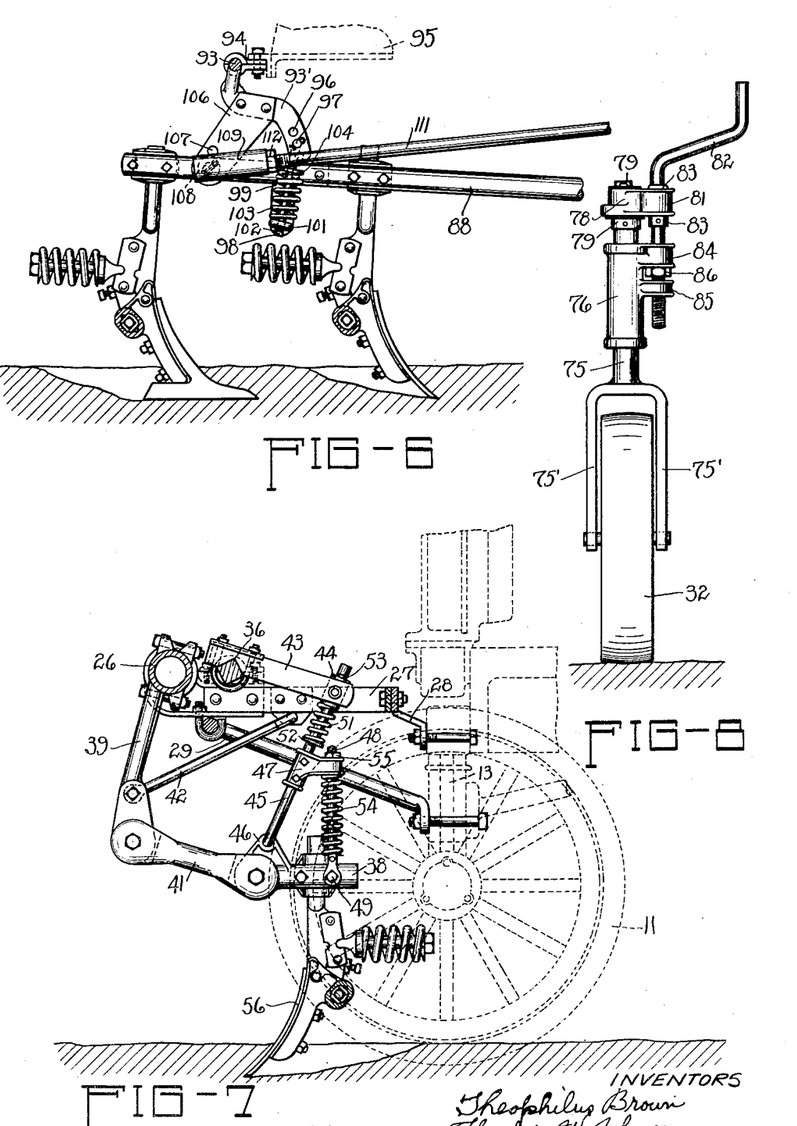
Fig. 6 is a detail sectional view through the rear portion of the attachment parts, taken approximately on the plane of the line 6—6 of Fig. 1.
Fig. 7 is a similar sectional view through the front portion of the implement, taken approximately on the plane of the line 7—7 of Fig. 1.
Fig. 8 is a front elevational view illustrating the manner of adjusting the outrigger wheels.

In the three row type of cultivator illustrated, the intermediate frame bar 26 supports an intermediate pair of cultivating rigs 38, and the outrigger frame bars 26' each support a pair of laterally disposed rigs 38'. Referring to Figure 7, the front end of each rig has draft connection with its respective frame bar through a downwardly extending draft bar 39 which is rigidly clamped to the frame bar, there being one of these draft bars 39 in the longitudinal plane of each cultivator rig. A draft link 41 is pivotally connected between the lower end of the bar 39 and the front end of the rig beam 38 or 38'. A brace bar 42 extends from the lower portion of each depending draft bar 39 up to a point of fixed attachment on its respective frame section. Each rig is raised and lowered through a lifting arm 43 which is securely clamped to the adjacent section of the rock shaft and which extends rearwardly therefrom substantially parallel to the draft link 41, there being one of these lifting arms for each rig. The rear end of each arm 43 is bifurcated and has a sleeve 44 pivotally mounted therein on trunnion pins extending through the side portions of the bifurcated arm.

A rod 45 passes downwardly through the sleeve 44 and is pivotally connected at its lower end to a bracket portion 46 extending upwardly from the rig beam. An extension arm 47 is secured to this link or rod and has a rod 48 extending downwardly through its rear end, such latter rod being pivotally connected at 49 to the rig beam. A compression spring 51 is mounted on the rod 45 between the bottom of the sleeve 44 and a fixed stop 52 on said rod. Normally this spring forces the rod downwardly until a pin or shoulder 53 carried by the rod, strikes the upper end of the sleeve 44. A like compression spring 54 is mounted on the other rod 48 between the extension arm 47 and a fixed stop on the lower portion of the rod. This spring tends to swing the rig beam downwardly relatively to the rod 45 until a nut 55, screwing over the upper end of the rod 48, engages with the upper side of the extension arm 47. The two springs 51 and 54 afford yieldable lost motion means through which the rig shovels are forced down into the ground, so that if when the arm 43 is swung downwardly to lower the shovels into cultivating position one of the shovels should be engaging an obstruction or hard ground, the springs 51 and 54 will yield and prevent breakage of the parts. The shovels are positively lifted to transport position through the stop members 53 and 55. By adjusting the nut 55 an independent depth adjustment may be given the rig beam 38 supported thereby. The independent depth adjustment of the outer rig beams 38' is effected through crank extensions 45' on the rods 45.

The cultivating tools may be in the form of shovels 56 or any other desired earth working elements, and may have any suitable mounting on the rig beams.

Figures 2, 5:
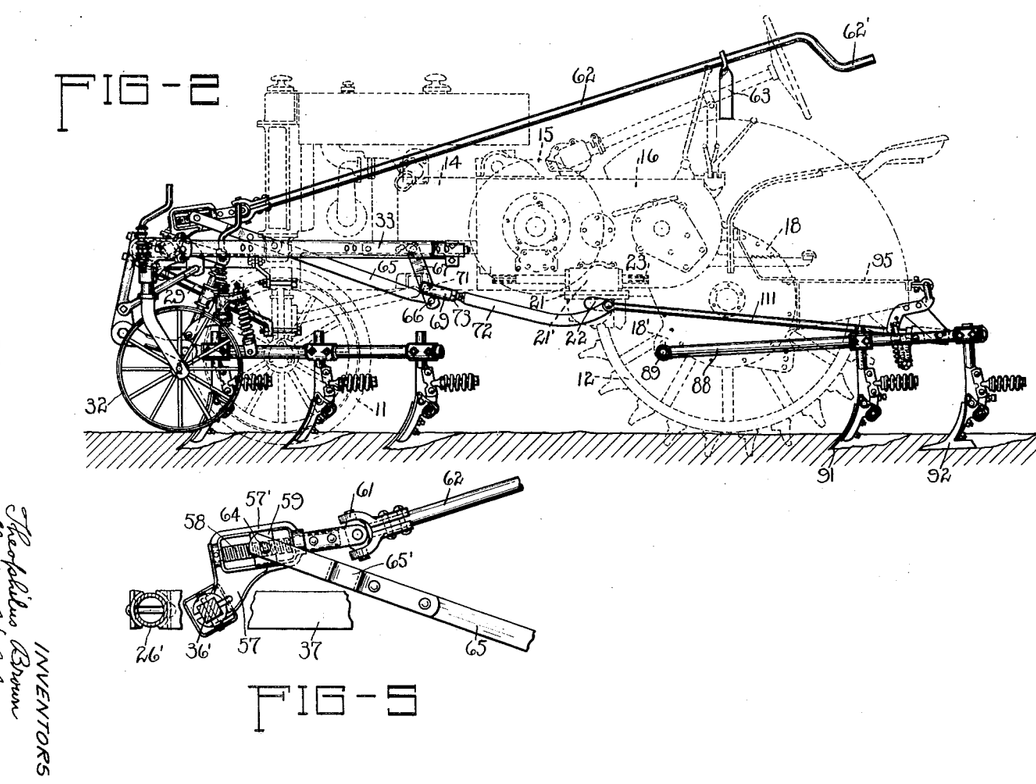
Fig. 2 is a side view showing the rigs in lowered operative position, and with the rear tractor wheel on the near side omitted to illustrate the construction to better advantage.
Fig. 5 is a detail sectional view through the front portion of the implement attachment, taken approximately on the plane of the line 5—5 of Fig. 1.

Rocking movement is transmitted to the three sections of the rock shaft 36, 36' through an arm 57 extending upwardly from one of these sections (Fig. 5). This arm has a long slotted yoke portion 57' in which a threaded shaft 58 is journaled. A nut 59 has threaded engagement with said shaft and is prevented from rotating thereon by having sliding engagement with the side portions of the yoke, whereby rotation of the shaft 58 is operative to shift the nut 59 inwardly or outwardly along the shaft. A universal joint 61 operatively connects the rear end of said shaft with an actuating rod 62 which extends rearwardly and has rotatable and sliding support in a bearing standard 63 rising from one of the tractor wheel fenders. A crank 62' on the rear end of said rod is in convenient location to the operator's seat 19 whereby he can actuate the threaded shaft 58 for effecting a master depth adjustment of all of the front cultivating rigs, as will presently appear. Projecting from opposite sides of the nut 59 are two pivot pins 64 which have pivotal connection with the front end of an operating bar 65, the latter having a strap 65' secured thereto and engaging over one of said pivot pins.

Figure 3:
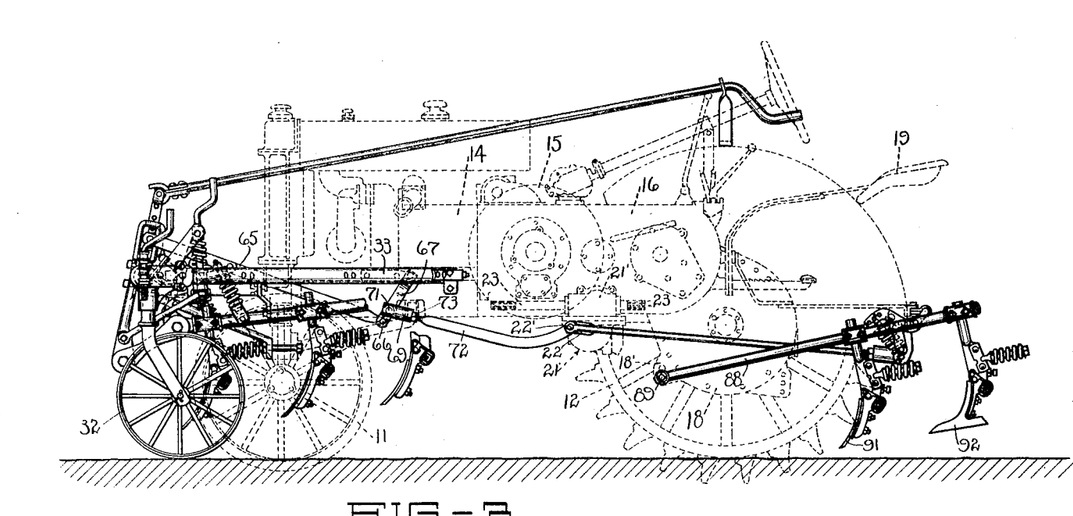
Fig. 3 is a similar side view illustrating the rigs in their raised, transport position.
Figure 4:
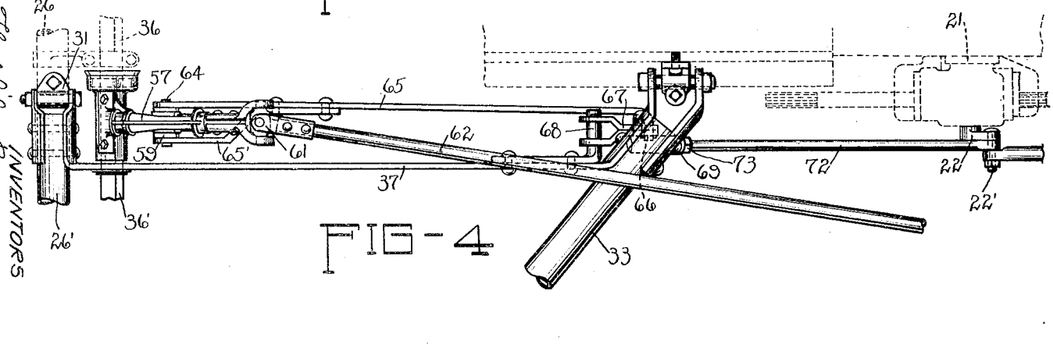
Fig. 4 is a detail plan view on a larger scale illustrating the power lift connections for the front rigs and the mechanism by which the master depth adjustments of these rigs are effected.

Referring to Figures 3 and 4 the rear end of said bar is pivotally connected at 66 to a motion transmitting lever 67 which is pivotally mounted at its upper end on a stud bracket 68 secured to one of the adjacent brace bars 37. An internally threaded sleeve 69 has detachable pivotal mounting at 71 on the lever 67. A bar 72 has a threaded forward end screwing into the sleeve 69, a lock nut 73 screwing over this threaded portion of the bar 72 serving to lock the bar and sleeve in any adjusted relation. The rear end of the bar 72 is pivotally mounted on the crank pin 22' carried by the power lift crank 22.

When the power lift crank 22 is swung forwardly toward the position illustrated in Fig. 3, forward thrusting movement is transmitted through the bars 72 and 65 to the pivot axis 64 on the arm 57. This causes said arm to be swung upwardly and forwardly, thereby oscillating the rock shaft sections 36, 36', swinging the lifting arms 43 upwardly, and raising all of the front rigs to the transport position illustrated in Fig. 3. The power lift crank 22 is positively held in this position by the locked relation of the driven clutch element of the half revolution clutch within the housing 21' and hence all of the rigs are held in this raised position until the clutch is again tripped.

Such results in the power lift crank swinging rearwardly to the position illustrated in Fig. 2, thereby transmitting a rearward pull through the bars 72 and 65 to the arm 57, with the result that the rock shaft sections are oscillated in the reverse direction, thereby causing all of the front rigs to be lowered to cultivating position. If the shovels cannot immediately enter the soil to the determined depth, the springs 51 and 54 yield until the shovels are free to move downwardly. The power lift crank 22 is also locked in this rearwardly extending position with the rigs lowered. In making a master depth adjustment of these front rigs the operator turns the adjusting crank 62' to cause relative movement between the threaded shaft 58 and the nut 59. Since the nut is positively held against endwise movement through the locked relation of the lifting bars 65 and 72, such relative threading movement causes the arm 57 to be angled upwardly or downwardly for effecting a lesser or greater depth adjustment of all of the front rigs. It will be noted that when the rigs are in raised position (Fig. 3) an arc swung from the pivot center 66 through the axis of the pins 64 lies substantially in tangential relation to the threaded shaft 58, from which it will be seen that the rigs will always be raised substantially to the same height irrespective of the master depth adjustment which has been established through the crank 62'.

Referring to Figures 2 and 3 it will be noted that the rear portion of the lifting bar 72 is bowed downwardly and the power lift crank 22 is so disposed on the side of the tractor that this crank and the bar 72 will both clear the fly wheel 15 in each cyclical throw of the crank from the lifted position of the rigs to the lowered position thereof and back to the lifted position. The interposition of the motion transmitting lever 67 between the bars 65 and 72 enables this motion transmitting linkage to clear the adjacent outrigger brace beam 33, and also avoids the use of a relatively long bar between the crank pin 22' and the pivot pins 64. When it is desired to adjust the limits of operation of the transverse rock shaft 36, 36' relatively to the throw of the power lift crank 22, either the sleeve 69 or the bar 72 is released from its pivots 71 or 22', and the sleeve is then threaded inwardly or outwardly along the bar for adjusting the distance between these pivots. Such accommodates different attachment conditions and different limits of movement of the rock shaft 36, 36' relatively to the throw of the power lift crank, and also permits the lower limit of depth adjustment of the cultivating rig to be shifted for a greater or lesser depth of penetration.

The outrigger frames can be vertically adjusted relatively to their supporting wheels 32 through the manipulation of the adjusting mechanism illustrated in Fig. 8. Each wheel is pivotally mounted between the rearwardly extending fork arms 75' of a wheel standard 75 having caster mounting in a sleeve 76. Said sleeve is formed integral with an elbow bracket 77 which is clamped by U bolts to the outer end of the outrigger frame where the bar 26' is bent rearwardly to form the reinforcing bar 33. A collar 78 is mounted on the upwardly projecting end of the wheel standard 75 between shoulders or stops 79 carried by said standard, the latter being rotatable within the collar 78. A boss 81 projects laterally from the collar and has a crank screw 82 journaled therein, this crank screw being held against endwise movement in the boss 81 by collars or shoulders 83 engaging the upper and lower ends of the boss. The lower threaded end of crank screw 82 passes through two bosses 84 and 85 projecting from the side of the mounting sleeve 76, the lower boss 85 being internally threaded for co-acting with the threaded portion of the crank. A lock nut 86 screws over this threaded portion and is adapted to be forced up against the boss 84 for locking the crank screw in any adjusted position. By releasing this lock nut and rotating the crank screw in one direction or the other the boss 85 and mounting sleeve 76 is caused to move upwardly or downwardly along the wheel standard for adjusting the height of the outrigger frame. In any adjustment thus established through the wheel 32, the latter still remains free to caster by the wheel standard 75 swiveling in the collar 78.

Referring now to the rear cultivating rigs, there are two of such rig beams 88 having their front ends pivotally supported at 89 on the tractor. Such rig beams may be differently mounted on different types of tractors, but with the type of tractor shown these beams are preferably disposed on the inner sides of the chain housings 18 with the front pivot bolts 89 mounted on lugs 18' extending forwardly from such housings (Fig. 2). For three row cultivation, a front cultivator shovel 91 is supported on each beam in position to cultivate in close proximity to the sides of the intermediate plant row. The outwardly bent rear ends of the beams carry shovels 92 disposed substantially in the path of travel of the traction wheels 12, these latter shovels preferably having relatively wide sweeps for cultivating the entire width of soil packed by each tractor wheel. Both shovels 91 and 92 are disposed in relatively close proximity to the axis of the traction wheels 12 so that there will be a minimum tendency to displace these shovels vertically with the rising and falling movement of the front end of the tractor in passing over uneven ground.

The power lift of the rear rig is effected through a rock shaft or bail 93 which is pivotally supported in bearing brackets 94 secured to the rear edge of the operator's platform 95. Referring to Fig. 6 the arms 93' of this bail are bent forwardly and downwardly, and at their lower ends are each provided with a series of holes 96 for receiving the pivot end 97 of a depending link 98. Riveted to each rig beam 88 is a depending arm 99 which has a laterally extending eye bolt 101 pivotally supported in its lower end. The link or rod 98 extends downwardly through this eye bolt and has a stop pin or shoulder 102 adapted to engage the underside of the eye bolt for transmitting lifting effort thereto. A spring 103 which encircles the link 98 bears at its lower end against the eye bolt 101 and at its upper end against a washer 104 which is held against a pin or other stop carried by the link 98 above the washer. It will be evident that when the bail arms 93' are swung downwardly the links 98 will act through the eye bolts 101 and bracket arms 99 to lower the two rig beams 88. If the shovels encounter difficulty in entering the soil the springs 103 will be compressed until the shovels have moved forward sufficiently to enter the ground to the desired depth. When the bail arms 93' are swung upwardly the rig beams are positively lifted to transport position by the engagement of the shoulders or pins 102 against the undersides of the eye bolts 101, such transmitting positive lifting movement to the bracket arms 99.

Extending downwardly from one of the bail arms 93' is an extension arm 106 having a plurality of adjusting holes 107 for receiving the pivot pin 108 of a sleeve 109. The interior of this sleeve is threaded for receiving the threaded rear end of a lifting bar 111, a lock nut 112, which screws over the threaded portion of said bar, serving to lock the sleeve and bar in any longitudinally adjusted relation. Such lifting bar 111 is bent laterally and forwardly (Fig. 1) and at its front end is pivotally connected with the pin 22' on the power lift crank 22. It will be seen from Fig. 2 that when this crank is swung rearwardly to lower the front rigs the bar 111 is thrust rearwardly to oscillate the rock shaft or bail 93 in a direction to also lower the rear rigs. Conversely the throw of the crank 22 in the opposite direction pulls forwardly through the rod 111 to raise the rear rigs simultaneously with the raising of the front rigs (Fig. 3).

The oscillation of the rear rock shaft can be adjusted relatively to the throw of the power lift crank in substantially the same manner as described of the front rock shaft, viz; by disconnecting the pivotal connection of either the sleeve 109 or rod 111, and screwing the same relatively to each other to increase or decrease the effective length of this rod. Depth adjustment of the rear shovels may be effected by shifting the pivot pin 108 to a different one of the holes 107, or by shifting the pivotal end 97 of the link 98 to a different one of the holes 96 in each bail arm. The springs 103 are preferably used under most operating conditions where the ground is relatively flat. However, when the implement is used in fields where there are sudden changes of slope it may be desirable to remove springs 103 and to depend merely on the weight of the rear rigs to obtain penetration of the shovels carried thereby. Thus, if the front end of the tractor is caused to rise considerably while the rear end of the tractor and the rear shovels are still on level ground, there is avoided the possibility of the springs 103 exerting sufficient downward pressure to cause the rear shovels to become buried too deeply in the ground. When said springs are removed the rear rigs will penetrate to the same depth irrespective of the angular positions that the tractor may take, such following from the fact that the weight of the rear rigs is always constant.

It will be seen from the foregoing that we have provided an implement possessing the advantages of a pushed cultivator while still cultivating the area in rear of the traction wheels and the area in proximity to the intermediate plant row or rows. The relatively close disposal of the rear shovels to the rear end of the tractor reduces the range of lateral movement of such shovels in a steering movement of the tractor and such minimizes the possibility of these rear shovels digging out plants in a sudden steering movement of the tractor. The transmission of power lift from the tractor to both the front and rear sets of rigs affords a simultaneous lifting and lowering of both sets so that the operations necessary to be performed by the operator in turning at the end of the field are simplified. The front portion of the cultivator attachment can be readily removed from the tractor by disconnecting the members 28, 29 and 33 therefrom, and the rear portion of the attachment can be readily disconnected by dismounting the beams 88, and disconnecting the rock shaft 93 or dismounting the same from the tractor. When these parts are removed the power lift mechanism 21 can still be employed for transmitting power to other implement parts which may be arranged at either the front or rear end of the tractor. It will be noted that this power take-off mechanism is operative to transmit take-off power either forwardly or rearwardly to different types of implements and actuated devices propelled by the tractor, without interference of the take-off connections with the front portion of the tractor or with the rear wheels 12 or the mechanism which transmits power thereto.

While we have shown what we consider to be the preferred manner of carrying our invention into effect we do not consider the invention as being limited to the details of this specific disclosure, but wish it to be understood that numerous departures and changes may be made or practiced within the broader aspects of the invention.

We claim:—

1. In an agricultural implement, the combination with a tractor including a motor, of implement means comprising cultivating rigs movably supported on the front portion of the tractor and cultivating rigs movably supported on the rear portion of the tractor, a power take-off device on the tractor deriving power from the motor thereof, and two fore and aft oscillating lifting bars extending from said device along the side of the tractor to the front and rear rigs for simultaneously transmitting lifting movement thereto.

2. In an agricultural implement, the combination with a tractor including a motor, of an attachment comprising a frame connected with the front portion of the tractor, cultivating rigs movably mounted on said frame, cultivating rigs movably supported adjacent to the rear portion of the tractor, and power lift mechanism deriving power from the tractor motor and comprising a power lift crank swinging at the side of the tractor and two lifting bars extending forwardly and rearwardly at the side of the tractor and both connected with said crank and adapted to simultaneously transmit lifting movement to both sets of rigs.

3. In an agricultural implement, the combination with a tractor including a motor, of an attachment comprising a frame connected with the tractor to rock with respect thereto in a transverse vertical plane, soil tilling rigs connected with said frame to swing toward or from the ground, a soil tilling rig movably mounted directly on the tractor, and mechanism comprising two rods movable in the same direction for simultaneously transmitting power lift movement from the tractor to all of said rigs.

4. In an agricultural implement, the combination with a tractor including a motor, of an attachment comprising a transversely disposed frame connected with the tractor in front thereof to rock with respect thereto in a transverse vertical plane, a front set of soil tilling rigs connected with said frame to swing toward or from the ground, a rear set of soil tilling rigs connected with the tractor to swing toward or from the ground, and power lift mechanism deriving power from the tractor motor for transmitting lifting movement to both sets of rigs, said mechanism comprising two rods movable in the same direction.

5. In an agricultural implement, the combination with a tractor including a motor, of implement means comprising a front set of cultivating rigs disposed adjacent to the front end of the tractor, a rear set of cultivating rigs disposed adjacent to the rear end of the tractor, depth adjusting means operatively connected with one set of rigs whereby said rigs will always be raised to the same height in the rig lifting operation irrespective of the adjustment of said adjusting means, and power lift mechanism deriving power from the tractor motor and operatively connected to lift both sets of rigs.

6. In an agricultural implement, the combination with a tractor including a motor, of implement means comprising a front set of cultivating rigs mounted on the front portion of the tractor, a rear set of cultivating rigs mounted on the rear portion of the tractor, and lifting means operable to lift both sets of rigs, including connections for actuating the same by power from said motor, the connections to one set of rigs being adjustable manually to increase or decrease the cultivating depth of said latter set of rigs.

7. In an agricultural implement, the combination with a tractor including a motor, of an attachment comprising outrigger members at the front of the tractor and pivotally connected therewith to permit rocking movement of said members relatively to the tractor, soil tilling rigs connected with said outrigger members to swing toward or from the ground, a second set of soil tilling rigs mounted on the tractor adjacent to the rear end thereof, and power lift mechanism comprising two rods movable in the same direction deriving power from the tractor motor for simultaneously lifting both sets of soil tilling rigs.

8. In an agricultural implement the combination with a tractor including a motor, of an attachment comprising outrigger frames pivotally connected to the front portion of the tractor whereby the outer ends of said frames can rise and fall relatively to the tractor, ground wheels supporting the outer portions of said frames, front cultivating rigs connected with said outrigger frames to swing toward or from the ground, a front rock shaft operatively connected with said front rigs to raise and lower the latter, a rear set of cultivating rigs connected with the rear portion of the tractor to swing toward or from the ground, a rear rock shaft operatively connected with said latter rigs to raise and lower the same, a power take-off device comprising a crank mounted at the side of the tractor capable of deriving power from the motor thereof when the tractor is stationary, and power lift connections extending from said crank to said front and rear rock shafts and movable in the same direction for simultaneously rocking said shafts.

9. In an agricultural implement, the combination with a tractor including a motor, of an attachment comprising a front set of cultivating rigs connected with the front portion of the tractor, a front lifting member connected to raise and lower said rigs, a rear set of cultivating rigs connected with the rear portion of the tractor, a rear lifting member connected to raise and lower said latter rigs, a power lift crank on the tractor deriving power from the motor thereof, and operating connections extending from said crank to said front and rear lifting members, said connections being adjustable for effecting proper movement of said members.

10. In an agricultural implement, the combination with a tractor including a motor, of an attachment comprising a front set of cultivating rigs associated with the front portion of the tractor, a rear set of cultivating rigs associated with the rear portion of the tractor, a power take-off device on the tractor deriving power from the motor thereof, and power lift connections extending from said power take-off device to said front and rear sets of rigs for raising and lowering the same, said power lift connections comprising resilient means through which motion is transmitted to said rigs in one direction.

11. In an agricultural implement, the combination with a tractor including a motor, of implement means mounted at the front and rear ends of the tractor and comprising devices adapted to be raised and lowered in the operation of the implement, a power lift crank mounted on the side of the tractor and deriving power from the motor thereof, and operating connections extending from said crank to the front and rear devices of said implement means.

12. The combination with a tractor comprising a motor, of power take-off mechanism comprising a crank at the side of the tractor intermediate the ends thereof, said crank swinging in a longitudinal plane for transmitting power to implement parts, clutch means for connecting the motor with said crank, and two lifting bars both connected with said crank and extending forwardly and rearwardly for simultaneously lifting implement parts at the front and rear ends of the tractor.

13. The combination with a tractor comprising a frame and a motor, of power take-off mechanism comprising a crank mounted on the side of the frame intermediate the ends thereof, said crank swinging in a longitudinal plane for transmitting power to operating parts of an implement at either end of said frame, a one-cycle stop clutch for connecting the motor with said crank, two fore and aft oscillating lifting bars both connected with said crank for simultaneous operation and extending toward the front and rear ends of the tractor, a motion transmitting lever mounted on the tractor and to which the front lifting bar is operatively connected, and a lifting link actuated by said lever and adapted to transmit lifting movement to implement parts at the front end of the tractor.

14. In an agricultural implement, the combination with a tractor including a motor, of an attachment comprising outrigger members at the front of the tractor and pivotally connected therewith to permit rocking movement of said members relatively to the tractor, soil tilling rigs connected with said outrigger members to swing toward or from the ground, a second set of soil tilling rigs mounted on the tractor adjacent to the rear thereof, a power take-off device on the tractor deriving power from the motor thereof, and power lift connections extending from said power take-off device to said front and rear sets of rigs for raising and lowering the same, said power lift connections comprising resilient means through which motion is transmitted to said rigs in one direction.

15. In an agricultural implement, the combination with a tractor including a motor, of implement means comprising a set of soil engaging devices adjacent to the front end of the tractor and a set of soil engaging devices adjacent to the rear end of the tractor, outrigger members pivotally connected with the tractor for rocking movement relative thereto, one of said sets of soil engaging devices being mounted on said outrigger members, and power lift mechanism deriving power from the tractor motor for lifting both sets of soil engaging devices relatively to the tractor and to said outrigger members.

16. In an agricultural implement, the combination with a tractor including a motor, of implement means comprising rigs movably supported on the front portion of the tractor and rigs movably supported on the rear portion of the tractor, earth working tools carried by said front and rear rigs positioned to simultaneously cultivate the soil at opposite ends of the tractor on forward movement thereof, a power take-off device on the tractor deriving power from the tractor motor and comprising crank means, and two fore and aft oscillating lifting bars extending from said crank means along the side of the tractor to said front and rear rigs for transmitting lifting movement thereto.

17. In an agricultural implement, the combination with a tractor including a motor, of an attachment comprising outrigger members at the front of the tractor and pivotally connected therewith to permit rocking movement of said members relatively to the tractor, soil engaging devices carried by said outrigger members, power lift mechanism deriving power from the tractor motor and comprising power lift crank means mounted on the tractor adjacent to the rear wheels thereof, and motion transmitting mechanism extending along the side of the tractor and connecting said power lift crank means with said soil engaging devices for lifting said soil engaging devices relatively to said outrigger members.

18. In an agricultural implement, the combination with a tractor including a motor, of an attachment comprising outrigger members at the front of the tractor and pivotally connected therewith to permit rocking movement of said members relatively to the tractor, soil engaging devices carried by said outrigger members, power lift mechanism deriving power from the tractor motor and mounted adjacent to the rear wheels of the tractor, and motion transmitting mechanism connecting said power lift mechanism with said soil engaging devices.

19. The combination with a tractor comprising a frame and a motor, of power take-off mechanism comprising a crank mounted on the side of the frame intermediate the ends thereof, said crank swinging in a longitudinal plane for transmitting power to operating parts of an implement at the front end of said frame, a one-cycle stop clutch for connecting the motor with said crank, a fore-and-aft oscillating lifting bar connected with said crank and extending toward the front end of the tractor, a motion transmitting lever mounted on the tractor and to which said lifting bar is operatively connected, and a lifting link actuated by said lever and adapted to transmit lifting movement to implement parts at the front end of the tractor.

20. In an agricultural implement, the combination with a tractor including a motor, of implement means comprising a front set of cultivating rigs mounted on the front portion of the tractor, a rear set of cultivating rigs mounted on the rear portion of the tractor, and lifting means deriving power from the tractor motor comprising two rods connected respectively with said front and rear sets of rigs and movable in the same direction for simultaneously lifting both sets of rigs.

21. In an agricultural implement, the combination with a tractor including ground engaging traction elements and a motor for driving the same, of implement means comprising a front set of cultivating rigs mounted on the front portion of the tractor, a rear set of cultivating rigs mounted on the rear portion of the tractor, lifting means deriving power from the tractor motor comprising a single operating lever, and two rods connected respectively with said lever and with said front and rear sets of rigs and movable in the same direction by said lever for simultaneously lifting both sets of rigs.

22. In an agricultural implement, the combination with a tractor, of a frame connected with the front portion of the tractor, a plurality of cultivator rigs connected with said frame, a rock shaft carried by said frame and connected with the rigs to raise and lower the same, a pair of cultivator rigs connected with the rear of the tractor, one rig being mounted adjacent each rear wheel of the tractor, a rock shaft supported at the rear of the tractor and connected with said rear rigs for raising and lowering the same, and lifting means operatively connected with said rock shafts.

23. An agricultural implement comprising, in combination, a transverse front frame bar, a plurality of sets of front soil working tools pivotally connected with said front frame bar, means serving as a rear transverse frame bar, a set of rear soil working tools pivotally connected with the rear frame bar, means for simultaneously raising and lowering said front and rear sets of tools, and means for independently adjusting all of the tools of one set relative to all of the tools of the other set.

24. In an agricultural implement, the combination with a tractor including a rear axle housing, chain housings connected with the outer ends thereof, axle shafts journaled in said chain housings, and driving connections for said shafts disposed in said axle housing, of cultivator rigs pivotally connected with said chain housings at the lower inner portions thereof and extending rearwardly therefrom, a transversely extending rock shaft carried by the tractor and connected with said rigs for raising and lowering said rigs, and means for rocking said rock shaft.

25. In an agricultural implement, the combination with a tractor having a central body, housings extending laterally therefrom, and drive housings depending from the outer ends of the laterally extending housings, of a cultivator rig pivotally connected to each of said depending housings and extending rearwardly therefrom, a transversely extending rock shaft carried by the tractor and connected with said rigs for raising and lowering the same, and power lift means connecting said rock shaft with the tractor motor for rocking said rock shaft.

26. In an agricultural implement, the combination with a tractor including a rear axle housing and depending housings at each end thereof, of a frame connected with the front portion of the tractor, a plurality of cultivator rigs connected with said frame, a rock shaft carried by said frame and connected with the rigs to raise and lower the same, a cultivator rig connected to each of said depending housings, a rock shaft supported at the rear of the tractor and connected with the latter rigs for raising and lowering the same, and lifting means operatively connected with said rock shafts for simultaneously rocking the same.

27. In an agricultural implement comprising a tractor having a central body, housings extending laterally therefrom, and drive housings depending from the outer ends of the laterally extending housings, the combination of a transverse front frame bar, a plurality of sets of front soil working tools pivotally connected with said front frame bar, a rock shaft carried by said frame bar and connected with said front soil working tools to raise and lower the same, a set of rear soil working tools pivotally connected with each of said depending housings, a rock shaft supported at the rear of the tractor and connected with said rear sets of soil working tools, means for rocking said rock shafts to simultaneously raise and lower said front and rear sets of tools, and means providing for the independent adjustment of the tools of each set relative to the tools of the other sets.

28. In an agricultural implement, the combination with a tractor including a motor, a rear axle housing and depending housings at each end thereof, of implement means comprising a front set of cultivating rigs mounted on the front portion of the tractor, a front rock shaft connected with said rigs for raising and lowering the same, a rear cultivating rig mounted on each of said depending housings, a transversely extending rear rock shaft carried by the tractor and connected with said rear rigs for raising and lowering the same, and lifting means deriving power from the tractor motor comprising two rods connected respectively with said rock shafts and movable in the same direction for simultaneously rocking said rock shafts.

29. In an agrictultural implement, the combination with a tractor having a central body, housings extending laterally therefrom, and drive housings depending from the outer ends of the laterally extending housings, of a cultivator rig pivotally connected to each of said depending housing and extending rearwardly therefrom, a transversely extending rock shaft carried by the tractor, means for rocking said rock shaft, and means connecting each of said rigs with said rock shaft whereby said rigs are raised and lowered by the rocking of said shaft, said connecting means being adjustable for varying the depth adjustment of said rigs relatively to each other.

30. In an agricultural implement, the combination with a tractor including a rear axle housing and depending housings at each end thereof, of implement means comprising a front set of cultivating rigs mounted on the front portion of the tractor, a rear set of cultivating rigs comprising a rig mounted on each of said depending housings, front and rear rock shafts for raising and lowering said front and rear sets of rigs, respectively, and means for rocking said rock shafts comprising a single operating member, and two rods connected respectively with said member and with said front and rear rock shafts and movable in the same direction by said lever for simultaneously lifting both sets of rigs.

31. In an agricultural implement, the combination with a tractor having a central body, housings extending laterally therefrom, drive housings depending from the outer ends of the laterally extending housings, and drive axles journaled in said drive housings and carrying traction wheels, of cultivator rigs pivotally connected with said depending housings, and extending rearwardly therefrom to a point directly behind said wheels, a transversely extending rock shaft carried by the tractor rearwardly of the axis of said wheels and connected with the rear portions of said rigs for raising and lowering the same, and means for rocking said rock shaft.

32. In an agricultural implement, the combination with a tractor having a motor, a central body, housings extending laterally therefrom, chain housings depending from the outer ends of the laterally extending housings, wheel supported axles journaled in the depending housings, and driving means disposed in said laterally extending housings and operatively connected with said axles, of a pair of cultivator rigs pivotally connected with said depending housings and extending rearwardly therefrom, a transversely extending rock shaft carried by the tractor and connected with the rear portions of said rigs for raising and lowering the same, and means actuated by the power of the tractor motor for rocking said rock shaft.

THEOPHILUS BROWN.
THEODORE W. JOHNSON.